United States Patent [19]

Ravenhall

[11] 3,951,563
[45] Apr. 20, 1976

[54] MANUFACTURE OF VEHICLE DISC WHEELS

[75] Inventor: Alan Ravenhall, Huntley, England

[73] Assignee: Dunlop Limited, London, England

[22] Filed: Aug. 29, 1973

[21] Appl. No.: 392,550

[30] Foreign Application Priority Data
Sept. 7, 1972  United Kingdom............... 41677/72

[52] U.S. Cl.................................. 408/1 R; 29/1 D; 29/159.01; 33/174 Q; 33/203.16; 51/DIG. 33; 51/165.71; 82/DIG. 8; 301/5 B; 408/2
[51] Int. Cl.²................................ B23B 35/00
[58] Field of Search .................. 408/1, 2, 11, 12; 29/1 D, 159.01; 82/DIG. 8; 51/DIG. 33, 106 R, 165.71; 33/174 Q, 203.16, 203.19; 301/5 B

[56] References Cited
UNITED STATES PATENTS

| | | | |
|---|---|---|---|
| 3,159,059 | 12/1964 | Fibikar et al............................ | 408/2 |
| 3,683,479 | 8/1972 | Lejeune............................. | 29/159.01 |
| 3,808,660 | 5/1974 | Wik..................................... | 301/5 B |

*Primary Examiner*—Othell M. Simpson
*Assistant Examiner*—Z. R. Bilinsky
*Attorney, Agent, or Firm*—Stevens, Davis, Miller & Mosher

[57] ABSTRACT

A method of truing a spigot located disc wheel comprising clamping the wheel between two adaptors, rotating the wheel, measuring the radial displacements at each bead seat, and operating a borer in response to the displacements to bore a central spigot hole in the true center of the wheel.

9 Claims, 3 Drawing Figures

MANUFACTURE OF VEHICLE DISC WHEELS

This invention relates to improvements in the manufacture of vehicle disc wheels.

With the improvement in road surfaces and the current trend for softer and more sophisticated vehicle suspensions in conjunction with smaller wheels and low profile tires the force variations generated by the non-uniformity of wheel and tire assemblies have become far more critical than in the past. It has always been a great problem for wheel manufacturers to produce a wheel that will run 'true' around its intended axis of rotation.

In the construction of a disc wheel using mass production techniques it is very difficult to position the disc relative to the rim, and to accurately position the disc center and thereby the axis of rotation of the wheel. If the mounting center of the wheel is misaligned from the true center of the wheel, force variations will be produced when the tire and wheel assembly is in motion. The vibrational effect caused by the out-of-balance forces as a tire rolls can be analyzed as a series of harmonics which can be distinguished as resulting from various inadequacies of the rim contour and tire.

One object of the present invention is to provide a method of truing a disc wheel.

According to one aspect of the present invention a method of truing a disc wheel of the kind having a rim including a pair of bead seats for supporting the beads of a pneumatic tire and a body portion in the form of a disc having a central hole for spigot-location of the wheel comprises mounting the wheel about an axis, measuring the radial displacements of at least one bead seat region of the rim at a plurality of positions around the wheel, and operating a borer in response to said displacements to bore the central hole in a position so as to ensure that the first harmonic of the vibrations generated as a result of said radial displacements when the wheel is mounted on a spigot and rotated, is of small amplitude.

According to a further aspect of the present invention an apparatus for truing a disc wheel of the kind having a rim including a pair of bead seats for supporting the beads of a pneumatic tire and a body portion in the form of a disc having a central hole for spigot location of the wheel comprises a pair of rotatable clamping adaptors arranged to clamp the nave of the disc, means to axially rotate the wheel, means to measure the radial displacements at each bead seating region in a plurality of positions around the wheel, a borer for the central spigot locating hole and means to operate the borer in response to said displacements to bore a central spigot locating hole in the true center of the wheel disc in order to ensure that the first harmonic of the vibrations generated by the radial displacements when the wheel is mounted on a spigot and rotated is of small amplitude.

A transducer or displacement sensor may be positioned with a sensing element engaging each bead seat to measure the displacements and the transducer or sensor may be connected in series with a digital computer.

A shaft encoder (digitizer) may be provided to convert the displacements measured at the bead seats into step inputs which are fed into the digital computer.

The invention will now be described by way of example only with reference to the accompanying drawings in which.

Figure 1:
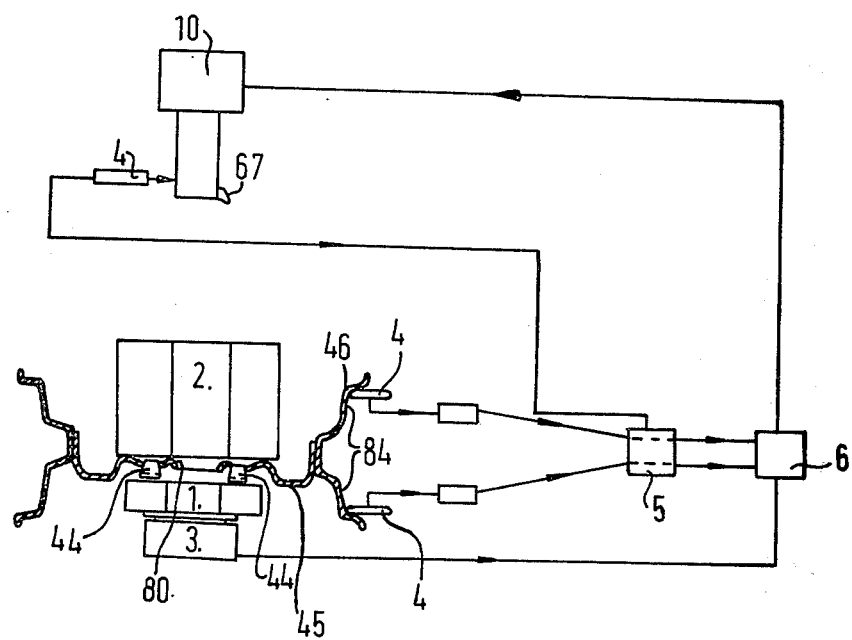
FIG. 1 is a schematic view of the layout of the apparatus.

With reference to FIG. 1 a method for truing a disc wheel of the kind including a pair of bead seats for supporting the beads of a pneumatic tire and a body portion in the form of a disc having a central hole for spigot location of the wheel comprises clamping a wheel 46 between two pneumatically or hydraulically actuated rotatable adaptors 1 and 2 provided on an in-line vertical boring machine 10.

Figure 3:
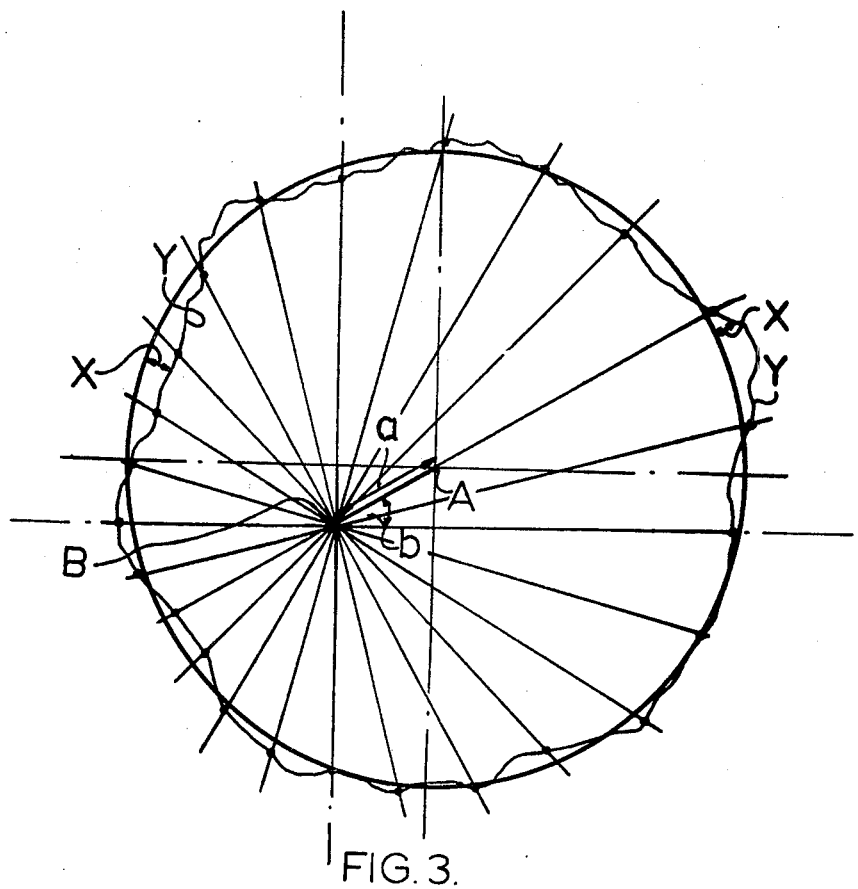
FIG. 3 shows the actual and ideal rotational contour of the periphery of a bead seat.

Because the central spigot locating hole is often not in the true center of the wheel, rotation of the wheel causes out-of-balance radial displacements as shown in FIG. 3 at each bead seat of the wheel. The variations of displacements X provide a wave form illustrated by the contour Y at each bead seat, and an average of the displacements measured at each bead seat at the same axial cross-section of the rim may be correlated to a single wave form. A vibration caused by the wave form of the average of the radial displacements of the bead seats comprises a series of harmonics, the first harmonic of which has been found to be the source of the majority of the vibration problems associated with the wheel. The amplitude and phase of the first harmonic of the average of the radial displacements of the bead seats may be calculated and the position of the true center to substantially reduce the vibrations may be determined.

In order to measure the radial displacements of the bead seats transducers or displacement sensors 4 (FIG. 1) are placed against each bead seat 84, and the wheel is rotated enabling the radial displacement at each bead seat to be measured at a plurality of positions around the wheel. The signals measured at the bead seats are converted into step impulses by a shaft encoder 3 and are subsequently fed into a digital computer 6. The computer carries out a Fourier analysis on the input signals to determine the amplitude and phase angle of the first harmonic of the radial displacements of the bead seats. The amplitude and phase signals are subsequently fed into the servo positional controlled boring machine 10 which is displaced to bore the true central spigot locating hole of the wheel to ensure that the amplitude of the first harmonic of the vibrations generated by the radial displacements of the bead seats is a small value.

FIG. 3 shows the mounting center B and the true center A of the wheel with the amplitude of the first harmonic shown as *a* and the phase angle as *b*.

Figure 2:
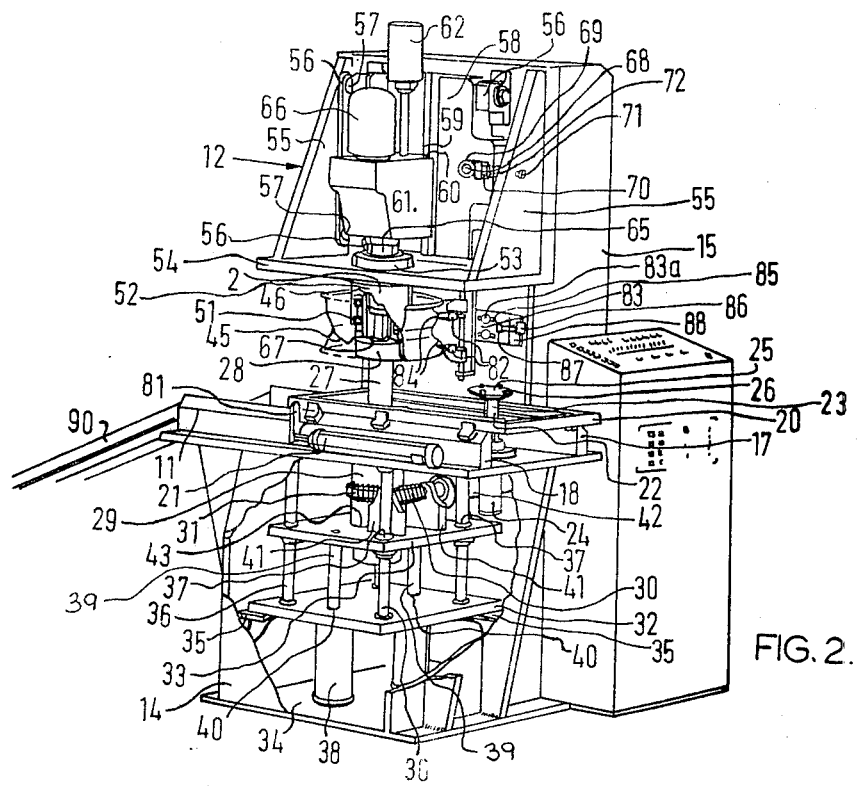
FIG. 2 is a perspective view of a boring machine in accordance with the invention.

A boring machine suitable for carrying out the above method is shown in FIG. 2 and comprises a horizontal work-table 11 and vertically displaceable boring head 61 which is located in a position vertically above the work-table 11 by a supporting frame of the machine. The supporting frame comprises a transmission casing 14 which forms the base of the machine and is integral with the working table 11 and a vertical back plate 15 which supports a boring head supporting frame 12 and is rigidly secured to the transmission casing 14. The work-table 11 is provided with two parallel guide surfaces 17 and 18 which extend axially along the length of the table and are arranged to act as supporting channels for a transfer member. The transfer member comprises a rectangular frame 20 which is axially displaceable along the guide surfaces 17 and 18 of the table 11 by means of a hydraulic or pneumatic displacement actuator 21 which is secured to the side of the work-table.

A vertically displaceable idler station 22 which consists of a pneumatic or hydraulic piston 23 and cylinder 24 assembly is secured to the base of the work-table 11. The piston 23 is provided with a circular adaptor 25 attached to one end, the adaptor 25 being furnished with axially extending studs 26 arranged in an equally spaced configuration around a pitch circle corresponding to the position of the stud holes in the nave of the disc of a wheel rim.

The piston 23 and adaptor 25 are arranged to be extendable through the rectangular frame 20 to positions vertically above and below the level of the work-table. A hollow shaft 27 having a circular adaptor flange 28 at one end is supported within a bearing housing 29 and is arranged to extend through the center of the work-table 11 in a plane parallel to the vertical plane of the machine. The shaft 27 is driven by a worm gear 30 and wheel 31 mechanism located within the transmission casing 14 underneath the work-table 11.

The transmission casing 14 incorporates two rectangular steel plates 32, 33 mounted one on top of each other above a base plate 34 of the machine. The lower plate 32 is rigidly secured to the side of the transmission casing 14 by supporting flanges 35. Four rectangularly spaced cylindrical columns 36 are rigidly secured, to one face of lower plate 32 and the base of the work-table 11, the columns 36 being arranged to extend through correspondingly positioned bushed apertures 37 provided in the upper plate 33. Two lifting piston 39 and cylinder 38 assemblies are secured in a spaced-apart relationship to the lower face of the plate 32, with the pistons 39 extending through clearance apertures 40 provided in the lower plate 32 and being secured to the base of the upper plate 33, thereby acting as a vertical support for the plate 33. The piston 39 and cylinder 38 assemblies are pneumatically or hydraulically operated and are arranged to vertically displace the upper plate 33 up or down the four cylindrical columns 36.

The worm gear mechanism 30 is supported by two support members 41 which are secured to the upper plate 33 and is driven by an electrical servo motor 42 which is also mounted on the plate 33. The gear wheel 31 is mounted on the shaft 27 and is arranged to engage the worm gear 30 such that rotation of the worm by the servo motor 42 causes a rotation of the shaft 27. The bearing housing 29 is secured to the upper face of plate 33, an aperture 43 being provided in the upper plate 33 through which the shaft 27 extends to engage a shaft encoder 3 which is secured to the plate 33. Vertical movement of the plate 33 by the pneumatic or hydraulic lifting cylinder 38 is transmitted to the shaft 27 by the bearing housing 29.

The adaptor flange 28 which is secured to one end of the shaft 27 comprises frusto-conical protrusions 44 (shown on FIG. 1) which are arranged to be located in the stud holes provided in the nave of one side of the disc 45 of a wheel 46. A second adaptor 2 is arranged to locate against the other side of the wheel disc 45 and comprises a flat ring supported by a roller bearing 51 within an outer bearing casing 52.

The outer casing 52 of the second (upper) adaptor is secured within an aperture 53 provided in a base plate 54 of the boring head supporting frame 12. The supporting frame 12 comprises a horizontal base plate 54 which is secured to the back plate 15 and is additionally supported by means of two triangular vertically extending side plates 55. The back plate 15 of the supporting frame is furnished with four rectangularly spaced lugs 56 which support two horizontally extending parallel shafts 57. The shafts 57 are arranged to extend through horizontally extending bushed drillings (not shown) provided one on each side of a boring head supporting plate 58. The dimensions of the plate 58 are such that there is clearance between the lugs 56 and the plate 58 thereby allowing the plate to move horizontally relative to the back plate 15 of the machine. The supporting plate 58 incorporates two vertically extending parallel guide rails 59 which are arranged to locate within corresponding cut-outs 60 provided in the rear face of the boring head 61 such that the boring head is displaceable vertically by means of a feed motor 62 which is secured thereon.

A rotatable boring shaft 65 driven by an electric motor 66 is arranged to extend vertically from the boring head through the top adaptor 2. A conventional boring tool 67 is secured to the end of the boring shaft 65. The horizontal movement of the boring head supporting plate 58 is transmitted by means of a cam 68 which extends through a drilling 69 which in turn extends through supporting plate 58 and back plate 15 and is driven by a servo motor (not shown) which is located behind the back plate 15. The cam 68 is arranged to engage a spring-loaded follower 70 comprising a lug formed on the supporting plate 58 with a horizontally extending rod 71 which extends from the lug to the side plate 55 and is free to move within an aperture provided in the side plate 55. A compression spring 72 is positioned between the lug and the side plate co-axially with the rod 71 and acts to hold the supporting plate 58 away from the side plate 55 and to eliminate backlash between the cam and follower. The cam 68 and follower 70 are designed so that half a revolution of the cam 68 horizontally displaces the supporting plate 58 and therefore the boring head 61 and tool 67 a distance of about 0.040 of an inch.

The boring machine is positioned at the end of a conventional wheel assembly line and a means is provided (not shown) to position one rim after another on the idler station 22 and to locate the studs 26 in the respective stud holes. Each rim 46 is in the substantially completed form with the central spigot locating hole 80 (FIG. 1) in a roughly formed state. The idler piston 23 is lowered until the outer periphery of the rim 46 rests on the rectangular transfer frame 20. The piston 23 is subsequently lowered below the level of the frame 20 until the studs 26 are clear of the rim 46. The idler station serves to accurately locate the rim on the longitudinal axis of the work-table with the stud holes in the required angular position. The transfer frame 20 is subsequently axially displaced by the displacement actuator 21 thereby transferring the rim 46 to the boring station which is located about the central axis of the machine. A stop 81 is provided on the work-table 11 to ensure the rim 46 is transferred to the exact position of the boring station.

When the rim 46 is in position on the boring station the shaft 27 and lower adaptor 28 are vertically displaced by displacing the upper plate 33 by means of the lifting cylinders 38 located within the transmission casing 14, until the frusto-conical protrusions 44 provided on the lower adaptor 28 locate within the stud holes in the nave of the wheel disc 45. On subsequent upward displacement of the shaft 27 the wheel 46 is lifted clear of the transfer frame 20 until the upward facing side of the disc 45 abuts the top adaptor 2 and is firmly clamped between the two adaptors 2 and 28. When the disc 45 is clamped in this manner the "Belleville" washer effect of an unmounted rim is removed, that is the ½° conical angle normally provided in the wheel disc in the unmounted position is removed, and the wheel is held as it would be when mounted on a vehicle.

Two parallel extending transducers or sensors 82 pivotally mounted on an adjustable bracket 83 are located against each bead seating portion 84 of the rim 46. The vertical distance between the transducers may be adjusted to suit wheels of varying widths. The mounting bracket 83 is secured to the rear plate 15 of the machine by means of two cap-head screws 83a which extend through elongated slots 85 in the bracket 83 and are threaded into the rear plate 15. An adjustment screw 86 which is located in a threaded aperture provided in a lug 88 secured to the rear plate 15 is arranged to act against a stop 87 provided on the transducer bracket 83 to vary the distance of the transducers 82 from the wheel center, to enable the apparatus to be used for wheels of varying diameters. The sensors 82 are pivotally mounted and may be displaced away from the boring station to enable the wheel to be transferred from the idler station to the boring station without fouling the delicate mechanism of the sensors.

With the wheel firmly clamped in position and the transducers 82 located against each bead seating portion, the transfer frame 20 is returned to its original position to enable another wheel to be located on the idler station 22. The wheel 46 is rotated through 1 revolution by means of the servo motor 42 acting via the worm 30 and wheel 31 assembly.

The sensors 82 measure the radial displacement with respect to the axis of the wheel of each bead seat 84 and the electrical signals produced by each sensor are fed into the digital computer 6 via an analogue to digital converter 5. A schematic view of the layout of the apparatus is shown in FIG. 1.

In order to convert the signals into step inputs the shaft encoder 3 is utilized which correlates each step input to a particular angle of rotation of the wheel.

The computer is programmed to carry out a Fourier analysis on the input signals of the displacement of the bead seats to compute the amplitude and phase angle of the first harmonic of the vibrations generated by the radial displacements of the bead seats. The phase angle of the first harmonic of radial displacement of the bead seats from the datum (the original position of the wheel before rotation) is compared by the computer with the signal from the shaft encoder 3. A signal is fed to the servo motor 42 which rotates the wheel 46 through the required phase angle. The wheel is then held in this position.

The amplitude of the first harmonic of radial displacement of the bead seats from the datum is fed to the cam actuating servo motor (not shown). The motor rotates the cam 68 which in turn displaces the boring head 61 via the support plate 58 to position the center line of the boring tool 67 with the true center of the wheel rim 46. A displacement sensor 4 (not shown on FIG. 2) is positioned against the tool shaft 65 to measure the displacement of the tool. The signals from the sensor are fed to the computer 6 via the analogue to digital converter to check that the position of the boring tool 67 is correctly aligned with the true center of the rim. When the wheel has been correctly maneuvered into position, the sensors 82 are displaced away from the bead seats 84 about the bracket 83. The central spigot hole 80 of the wheel is then finally bored by the boring tool which is lowered by the feed motor 62. Once the boring is complete the boring tool 67 returns to its original position; the shaft 27 and lower adaptor 28 are lowered by the lifting cylinder 38 leaving the wheel 46 resting on the transfer frame 20. The boring station adaptor 28 (the lower adaptor) is rotated back to the datum position by the servo motor 42 via the worm 30 and wheel 31 assembly. The transfer frame 20 is horizontally displaced by the displacement actuator 21; the finished wheel 46 is ejected by means (not shown) down an inclined delivery shute 90, and another wheel is located on the boring station. The finished wheel has the central spigot locating hole accurately positioned in the true center of the wheel to substantially remove the first harmonic of the vibrations generated by the radial displacements of the tire bead seats.

It is also possible to provide a boring machine with a boring head displaceable in cartesian co-ordinates. In this case the computer would convert the results of the Fourier analysis into $x$ and $y$ co-ordinates which would be fed to two servo motors located against the boring head to displace the head to the true center of the wheel. It is also understood that the choice of computer, and refinements of the boring machine such as transducers, servo motors and pneumatics or hydraulics are purely optional and are limited by design and cost parameters.

The apparatus described above may be positioned at the end of an automatic rim and disc manufacturing line with the object of producing a disc wheel with the average of the first harmonic of radial displacement of the bead seats reduced to a figure in the order of 0.001 inch peak-to-peak.

The advantages of the equipment are that no further post process inspection to measure the first harmonic is required, eliminating the need for high spot marking of the wheel and subsequent selective assembly of tire and wheel. The positive location of the nave of the disc between the adaptors eliminates the contribution of the first harmonic of radial displacements resulting from the angular misalignment of the disc. Furthermore, no physical deformation occurs which may cause resultant internal stresses as in the case of other wheel truth machines.

Having now described my invention what I claim is:

1. A method of truing a disc wheel of the kind having a rim including a pair of bead seats for supporting the beads of a pneumatic tire and a body portion in the form of a disc having at least one location hole for mounting the wheel, comprising mounting the wheel about an axis, measuring the radial displacements of at least one bead seat region of the rim at a plurality of positions around the rim, calculating the value of the amplitude and phase of the first harmonic of the vibrations generated as a result of the radial displacements and feeding signals corresponding to the amplitude and phase of the first harmonic to a servo positional controlled machine to align the center line of a tool of said machine with the true center of the location hole, and machining the hole to ensure that when the wheel is mounted and located by the hole and rotated, the first harmonic is of small amplitude.

2. A method according to claim 1 wherein said servo positional controlled machine is a boring machine and said tool is a boring tool.

3. A method according to claim 2 comprising feeding the amplitude and phase signals in polar co-ordinates to the servo positional controlled boring machine and operating the machine in response to said co-ordinates.

4. A method according to claim 3 comprising rotating the wheel from a datum position to a phase co-ordinate and displacing a boring head of the machine to the required amplitude.

5. A method according to claim 2 comprising converting the amplitude and phase signals into Cartesian co-ordinates of the true center of the wheel, feeding said co-ordinates to a boring head of said machine, and displacing the head from a datum position to the co-ordinates.

6. A method according to claim 1 comprising clamping the disc of the wheel, rotating the wheel and measuring the radial displacements at each bead seating region at a plurality of positions around the wheel.

7. A method according to claim 6 wherein said clamping step includes clamping the wheel disc between two adaptors, and locating protrusions provided on one adaptor through stud holes provided in the disc to remove any distortion in the disc thereby simulating the assembly of the wheel on a vehicle.

8. A method according to claim 6 comprising converting into step inputs the radial displacements of each bead seat region measured at a plurality of positions around the wheel for each bead seat, taking the average of the step inputs measured at each bead seat region for one particular position and transmitting the averaged step inputs into a computer and programming said computer to carry out a Fourier analysis on the averaged step inputs to determine the amplitude and phase of the first harmonic of the vibrations generated as a result of the radial displacements of the bead seat regions.

9. A method according to claim 1 comprising measuring the displacement of a boring head of said machine from a datum and feeding back said measurement to correlate the required and actual displacements of the head.

* * * * *